Figure 1:
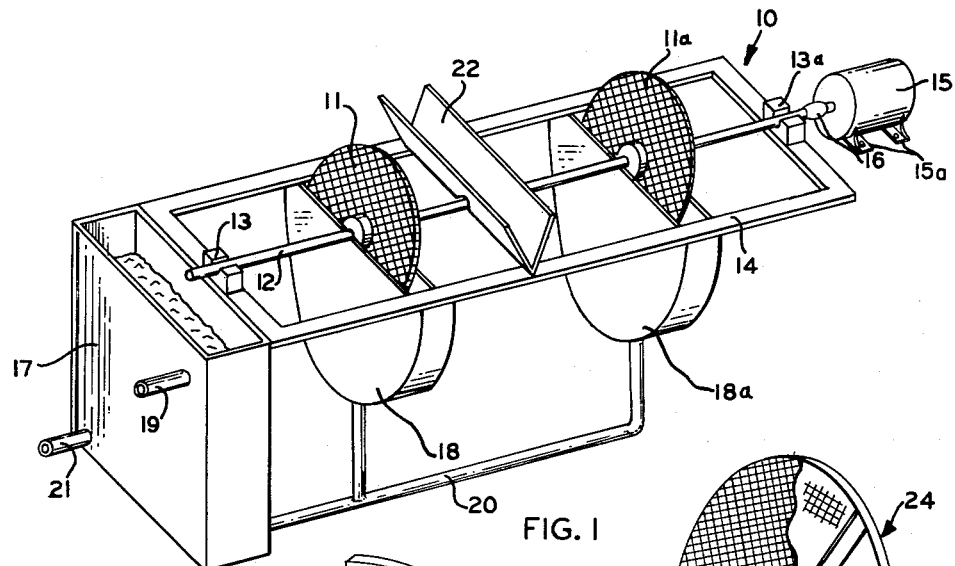

INVENTOR.
BERNARD W. KILGORE

United States Patent Office 3,229,966
Patented Jan. 18, 1966

3,229,966
HUMIDIFYING DEVICE
Bernard W. Kilgore, 2325 E. Indian Way,
North St. Paul 9, Minn.
Filed Dec. 18, 1961, Ser. No. 160,022
2 Claims. (Cl. 261—92)

This invention relates to humidifiers and to rotative structures for use therein. Devices made in accordance with this invention are particularly suited for installation in conjunction with forced air heating systems.

It is well known that air which is supplied to a heated area during the winter months must be artificially provided with moisture if the relative humidity is to be maintained at a comfortable and healthful percentage. Accordingly, a vast number of humidifying devices have been developed. These devices have had varying degrees of commercial success, but none of them, at least so far as I am aware, has been really satisfactory; to illustrate, if a fine spray of water is introduced into the air, a fine dust from the salts dissolved in the water pervades the area being humidified.

One of the earliest humidifying techniques involved the evaporation of water from a shallow pan somewhat like a large ice cube tray placed in an area through which heated air was passed. Evaporation was comparatively slow, and an improvement was made when porous plates were placed on edge in the pan, thus providing a greater evaporative surface. Such plates, however, lose their effectiveness quickly as they clog with the dissolved salts which remain after the water evaporates. Further, unless the prohibitively expensive step of locating a separate unit in each horizontal run of air duct is taken, the pan, located in the hot air plenum, tends to divert the air which rises around it and keep it from effectively contacting the plates. If the plates are replaced with a rotary tubular screen, clogging with salt is minimized, but the pan still inhibits contact of the air with the moisture-bearing surface.

I have now devised a simple but extremely effective means for imparting moisture to air, especially suitable for mounting in the plenum of conventional hot air furnaces. Vertically rising air passes in close contact with the moisture carrying means of this device, thus insuring highly efficient humidification and obviating the necessity of mounting the device in an individual horizontal run. The moisture-carrying elements in my device are durable, interchangeable, and readily cleaned, thus minimizing the problems normally associated with the evaporation of water in large quantities. The nature of my humidifying device is such that it can be readily modified to supply a desired amount of moisture to the hot air which passes about it, making it easy to tailor each unit to operate in the manner desired by its owner.

In accordance with my invention, I mount one or more rigid disc-like moisture-carrying elements so that it is rotatable about an axis extending through the center of the disc. The lower portion of the moisture-carrying element is mounted in a narrow water tank, preferably streamlined and little wider than the element, so that air can pass about the tank and come in contact with the exposed and moist upper part of the element.

Figures 2, 5:
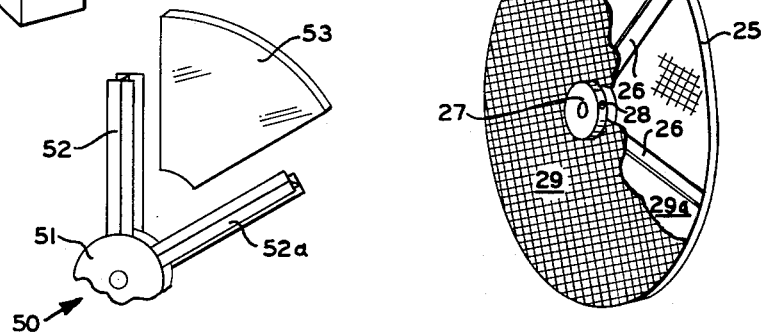
Figure 3:
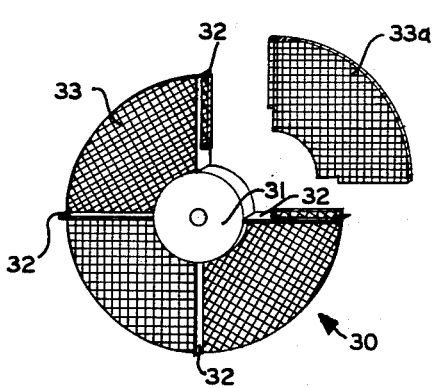
Figure 4:
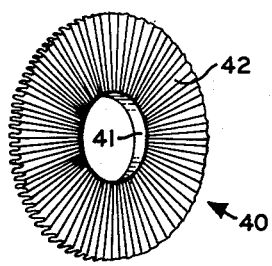

My invention will be more readily understood upon reference to the attached drawings in which:

FIGURE 1 is a somewhat stylized view in perspective of a typical humidifying device made in accordance with my invention;

FIGURES 2, 3, and 4 are views in perspective of suitable moisture-carrying disc-like elements; and FIGURE 5 is a view in perspective of a portion of another type of moisture-carrying element.

With reference to FIGURE 1, humidifier unit 10 comprises humidifier discs 11 and 11a mounted on shaft 12, which in turn is supported by V-blocks 13 and 13a. Discs 11 and 11a are made of a material which is stiff enough to resist deformation by the passage of the air over its surface, e.g., an open-mesh screen fabric which is desirably made of corrosion-resistant wire. V-blocks 13 and 13a are mounted on a supporting frame 14, shaft 12 being driven by motor 15 having mounting brackets 15a (the support therefor not being shown) through flexible connection 16, e.g., of the type shown in Marks' Mechanical Engineers' Handbook, Sixth Edition (1958), page 8–48, Fig 59. The purpose of the flexible connection is intended merely to reduce starting shock and may satisfactorily be replaced with other previously known shaft connections. Discs 11 and 11a are mounted so that their lower portions are submerged in water tanks 18 and 18a, the upper portions of the discs being exposed. The width of tanks 18 and 18a is as narrow as possible in order to minimize air resistance. Water is supplied to tanks 18 and 18a from reservoir 17, which may be mounted either inside or outside the plenum of the hot air furnace in which unit 10 is to be installed. Water is supplied to reservoir 17 through inlet 19, the height of water in reservior 17 and tanks 18 and 18a being controlled by a float valve (not shown). Tubing 20 provides a connection between reservoir 17 and tanks 18 and 18a, the drain 21 permitting the entire water system to be drained, e.g., for purposes of cleaning. If discs 11 and 11a become clogged with lime or other salts, they may be removed from shaft 12 and either replaced with other discs or cleaned, e.g., by wire brushing or brief immersion in dilute acid, and reinstalled. If desired, the water supply to reservoir 17 through inlet 19 may be temporarily shut off, the system drained, and dilute acid introduced to dissolve the salts, after which the system is flushed with water and returned to service.

Two-winged deflector vane or V-shaped baffle 22 is mounted so that vertically rising air can be more effectively directed against the lateral surfaces of humidifier discs 11 and 11a. If desired, this deflector vane can be arranged so that the angle which either wing makes with respect to the vertical can be adjusted, thus providing a means for controlling both the amount of air which contacts discs 11 and 11a and the speed with which the air passes over their surfaces.

I have found that humidifier device 10 can be made to function very effectively if discs 11 and 11a are about 12 inches in diameter and made from screening having 15 meshes per inch in each direction. A suitable motor speed has proved to be 13 r.p.m., but I contemplate the use of a variable speed motor, thereby providing another convenient means for regulating the amount of moisture transferred to the air. It should be noted, however, that the motor speed ought not be so high that water is centrifugally spun from the discs.

I further contemplate the use of a hygrostat to be mounted in the area to which the heated and humidified air is ultimately supplied, this hygrostat being connected to close or open a relay in the circuit which supplies electricity to motor 15. Thus, the humidity which is to be attained can be established at any predetermined value. Generally, I prefer that the electrical circuit for motor 15 be arranged in such a way that the motor is energized only when heat is supplied to the furnace and the air in the plenum is subjected to heating; under some circumstances it may be desirable to energize motor 15 only when the fan which circulates the heated air is running.

The disc element 24 shown in FIGURE 2 comprises a hub 27 from which spokes 26 extend radially and are secured to rim 25. Spokes 26 and rim 25 may, for example, be made of 1/8" brass tubing, which is highly resistant to corrosion in the environment in which it must operate. Affixed to the lateral surfaces of the framework defined by spokes 26 and rim 25 are open mesh discs 29 and 29a. Set screw 28 is used to fasten hub 27 to the shaft on which it is mounted in a humidifier unit made according to my invention. It will be readily seen that disc unit 24 provides a means whereby water may be evaporated from two water-carrying surfaces at the same time, thus providing for an increased amount of water pickup for approximately the same space as that occupied by discs 11 and 11a, shown in FIGURE 1. In addition, rim 25 and spokes 26 provide an increased amount of rigidity for the moisture carrying fabric or other material, thus permitting the use of extremely inexpensive materials to construct discs 29 and 29a.

FIGURE 3 illustrates another disc unit 30, made up of hub 31 from which extend spokes 32, slotted at right angles to the axis of hub 31 and preferably being made of stiff sheet metal. Disc unit 30 also includes screen 33, the periphery of which defines a circle concentric with hub 31. Screen 33 is desirably formed from a number of sectors, as sector 33a illustrates, with the sectors gripped between the arms of spokes 32, to provide a disc unit with readily renewable water-carrying means. Again, spokes 32 provide a sufficient degree of strengthening and stiffening to permit the use of a comparatively thin open mesh material for the formation of water-carrying means 33.

FIGURE 4 illustrates a water-carrying disc unit 40 made by pleating an ordinary elongated strip of window screen to form a self-supporting unit. Screen 42 is folded so that radially extending ribs provide integral stiffness, the thus plated unit being shaped to an annular form and affixed to hub 41. Another advantage of the particular structure shown in FIGURE 4 resides in the fact that a greatly increased amount of surface area is obtained, thus permitting each disc unit to supply a considerable amount of moisture to the air with which it comes in contact.

It will be noted from the preceding description that open mesh fabric and material provides an extremely suitable moisture carrying means by the manufacture of disc units used in the practice of my invention. Each individual mesh as it dips through the water tank in which its lower portion is submerged, picks up water which is retained by surface tension to span the opening which is defined by the warp and woof threads of the fabric. The water forms a thin film and is hence readily evaporated as air passes over the surface of the unit. Because metal open mesh fabrics are themselves fireproof and comparatively stiff, they have many advantages as a material from which disc units may be formed. It is, however, equally possible to use an open mesh plain weave or leno weave textile fabric formed from continuous filament yarns which are preferably bonded together at the points where they cross to prevent slippage. Because such fabrics are inherently more flexible than metal fabrics, the need for providing some type of support is greater. A disc may be rendered suitably stiff, however, by such a simple expedient as fastening the well-known two-part embroidery hoop at its periphery, thus clamping the fabric taut and effectively stiff.

The narrow humidifying disc principle taught herein is also useful with other materials than screen and open mesh fabrics. Disc assembly 50 illustrated in FIGURE 5 is exemplary. In disc assembly 50 double channel spokes 52 and 52a extend radially from hub 51. A suitable moisture carrying means 53 in sector form is inserted between the radially adjacent hubs and clamped in position by the wedging action imparted by spokes 52 and 52a. Moisture carrying means 53 may in this instance be made of a thin comparatively fragile expanded asbestos sheet material similar to that commonly employed for the plates of hot air furnaces. Although this material is appreciably more prone to injury than the open mesh fabrics previously described, it possesses the advantage of being readily wedged in position and easily removed when desired. Modifications which will be apparent to any skilled mechanic will also suggest themselves so as to permit the employment of screen and other materials in disc assembly 50.

It will be apparent that my invention is susceptible of innumerable variations which will become apparent to the man normally skilled in the art upon reading the foregoing description. For instance, the principles of humidification with a thin rotary disc may find application in the evaporation of liquids other than water. Having, however, described my humidfying device with stood that the scope of my invention is limited only by the aid of several illustrative examples, I wish it understood that the scope of my invention is limited only by the scope of the appended claims, which are to be construed in the light of the doctrine of equivalents as it pertains thereto.

What I claim is:

1. A humidifier comprising in combination: a horizontally disposed rigid frame, bearing blocks mounted on said frame, a rotatable shaft supported in a horizontal plane by said bearing blocks, a plurality of humidifying discs rigidly axially mounted on said shaft, each of said discs comprising a screen retaining large drops of water in its mesh openings by means of surface tension, a plurality of water tanks each having a width only slightly greater than the width of said disc mounted on said frame, positioned below said shaft, means horizontally spacing the water tanks and discs from each other to define a passage for air around the tanks tnd discs, and each of said tanks surrounding the lower portion of one of said discs so as to leave at least approximately the upper half of said discs exposed, means defining a V-shaped baffle mounted on said frame and positioned between adjacent discs to divert rising air toward one side of the exposed upper half of each of said adjacent discs, means for supplying water to said tanks, whereby air passing upward will pass around said tanks and evaporate water carried by the upper half of said discs, and a driving means rotating said shaft and discs at a speed sufficient to supply water for evaporation but insufficient to throw water off by centrifugal force.

2. The humidifier of claim 1, further characterized in that a water reservoir, spaced horizontally from said tanks, is connected by tubing to the lower portion of each of said tanks.

References Cited by the Examiner

UNITED STATES PATENTS

| 1,844,942 | 2/1932 | Buttfield | 261—92 |
|---|---|---|---|
| 2,060,732 | 11/1936 | Hopkins et al. | 261—92 |
| 2,144,426 | 1/1939 | Klein | 261—92 |
| 2,261,830 | 11/1941 | Ditner | |
| 2,288,981 | 7/1942 | Viebrock | 261—92 |
| 2,343,820 | 3/1944 | Thornton | 261—92 XR |
| 2,437,936 | 3/1948 | Carraway | 261—92 |
| 2,537,211 | 1/1951 | Cox. | |
| 2,641,455 | 6/1953 | Poirot. | |

(Other references on following page)

UNITED STATES PATENTS

| | | | |
|---|---|---|---|
| 2,823,907 | 2/1958 | Pennington | 261—92 |
| 2,967,050 | 1/1961 | Geen | 261—92 |
| 3,013,780 | 12/1961 | Wistrich | 261—84 |

FOREIGN PATENTS 952,886   5/1949   France.

OTHER REFERENCES

"The Vanderbilt Rubber Handbook 1958," R. T. Vanderbilt Co., New York, N.Y., copyright 1958, pages 238 and 239.

HARRY B. THORNTON, *Primary Examiner.*

HERBERT L. MARTIN, *Examiner.*